United States Patent [19]
Blaschek et al.

[11] Patent Number: 5,175,573
[45] Date of Patent: Dec. 29, 1992

[54] FILM TRANSPORT DEVICE

[75] Inventors: Otto Blaschek, Aschheim, Fed. Rep. of Germany; Ernst Tschida; Josef Haas, both of Vienna, Austria

[73] Assignee: Arnold & Richter Cine Technik GmbH & Co. Betriebs KG, Munich, Fed. Rep. of Germany

[21] Appl. No.: 571,658

[22] PCT Filed: Mar. 9, 1989

[86] PCT No.: PCT/DE89/00159
  § 371 Date: Oct. 26, 1990
  § 102(e) Date: Oct. 26, 1990

[87] PCT Pub. No.: WO89/08868
  PCT Pub. Date: Sep. 21, 1989

[30] Foreign Application Priority Data
  Nov. 3, 1988 [DE] Fed. Rep. of Germany ....... 3808106

[51] Int. Cl.⁵ ............................................. G03B 21/48
[52] U.S. Cl. ................................... 352/180; 352/182; 352/187
[58] Field of Search ............... 352/160, 180, 182, 166, 352/187

[56] References Cited

U.S. PATENT DOCUMENTS

| | | |
|---|---|---|
| 3,248,029 | 4/1966 | Money ........................... 352/180 |
| 3,565,521 | 2/1971 | Butler et al. ................... 352/180 |
| 3,642,357 | 2/1972 | Meyer . | |
| 3,819,258 | 6/1974 | Butler et al. ................... 352/180 |
| 4,022,525 | 5/1977 | Boudouris ..................... 352/180 |
| 4,150,886 | 4/1979 | Merkel et al. ................. 352/180 |
| 4,697,896 | 10/1987 | Fox . | |

FOREIGN PATENT DOCUMENTS

| | | |
|---|---|---|
| 1089264 | 9/1960 | Fed. Rep. of Germany . |
| 2027882 | 12/1971 | Fed. Rep. of Germany . |
| 2347411 | 4/1974 | Fed. Rep. of Germany . |
| 2738322 | 3/1978 | Fed. Rep. of Germany . |
| 2722378 | 5/1978 | Fed. Rep. of Germany . |
| 2808974 | 9/1979 | Fed. Rep. of Germany . |
| 2822392 | 12/1979 | Fed. Rep. of Germany . |
| 3127778A1 | 2/1983 | Fed. Rep. of Germany . |
| 3217014A1 | 11/1983 | Fed. Rep. of Germany . |
| 2760024C2 | 5/1986 | Fed. Rep. of Germany . |
| 2371701 | 6/1978 | France . |
| 2054887A | 2/1981 | United Kingdom . |
| WO83/00233 | 1/1983 | World Int. Prop. O. . |

*Primary Examiner*—Monroe H. Hayes
*Attorney, Agent, or Firm*—Fish & Richardson

[57] ABSTRACT

Apparatus for intermittent or continuous transport of a film using a film transport device comprising a drive motor whose shaft firstly is connected with a sprocket engaging at least one row of holes in the film and secondly with a position sensor which delivers position signals corresponding to the angular position of said motor shaft, to a control and regulating device whose output controls the drive motor through a DC amplifier, so that during intermittent transport of the film, each film pitch is subdivided into at least one acceleration phase, one deceleration phase, and one position-regulating phase, said phases preferably having variable or programmable lengths, with the set values for the acceleration and deceleration of the film transport device having their rises limited.

13 Claims, 4 Drawing Sheets

FILM TRANSPORT DEVICE

The invention relates to a film transport device.

DE-C2-27 22 378 teaches a film transport device having an intermittently driven film transport sprocket whose teeth engage the film perforations and transport the film stepwise. A control device controls the motor driving the film transport sprocket so that the latter advances the film one frame at a time. Film transport is controlled by a pattern for the current supplied to the drive motor of the film transport sprocket as each frame is advanced, that divides the process into an acceleration phase, a deceleration phase, and a position-adjustment or final positioning phase.

A marking detector is provided for final positioning, said detector, in a fixed spatial relationship to the individual frames, scanning markings on the film and using them to generate drive motor control signals so that, depending on the amount the film-integral marking deviates from a predetermined specified position, the film is either advanced or transported backward. Then the deviation from the specified position is detected once more and final positioning of the film is repeated as necessary until the specified position is reached. The film-integral marking can be in the form either of perforations in the film or of markings made on the film during exposure.

DE-A1-32 17 014 teaches a film transport device with a claw mechanism driven by a drive motor, the transport and locking claw of said device engaging the film perforations with play, advancing the film stepwise one frame at a time, and final-positioning it in the image window. Final positioning of the frames to be projected is accomplished either by using the actual frame to be projected or by using a reference marking associated with said frame.

Since the film pitch in known film transport devices uses a time interval of only 10 milliseconds, at a film speed of 24 frames per second or approximately 41 milliseconds, 31 milliseconds remain for exposure or projection of one frame, ensuring high image brightness and quality.

One disadvantage of known frame transport devices is that abrupt transitions in acceleration and deceleration of the film transport generate considerable noise, and damage to the film perforations cannot be ruled out. This is especially true when film resistance is increased by a splice, for example, so that in order to accelerate the film within the fixed acceleration phase, the film perforation is engaged with greater force and then the film is braked more sharply, further increasing the noise level and the risk of damaging the film.

DE-C2-27 60 024 teaches a control device for film transport in a film projector with a rotary shutter and a main motor on whose shaft a perforated disk is mounted, associated with a control circuit for generating control signals as a function of the angular position of the motor shaft. The control signals from the control circuit power the main motor through a power amplifier and are divided into three phases of movement, with constant acceleration being given to the main motor within a first shaft rotation angle, the main motor being kept at a constant speed at a second shaft rotation angle, and then braked at constant deceleration in a third shaft rotation angle.

In this known control device for intermittent transport of individual frames, constant acceleration and constant deceleration are used, with the film being transported through a predetermined angle of rotation at constant speed between the two intervals. In this manner, film tension is kept constant, avoiding peak loads in film tension and providing protective frame transport even at higher film transport speeds.

However, because of the abrupt transitions from the acceleration phase to the synchronous phase at a constant speed and from the synchronous phase to the deceleration phase, increased loads on the film and loud noise cannot be avoided. In this known control device, too, increased film resistance imposes a much greater load on the film, since a predetermined distance must be covered during the fixed transport intervals for one complete frame to be advanced within the specified time.

The goal of the invention is to improve the film transport device to provide more protective film transport and reduced noise output.

The nature of the transport pattern according to the invention, with individual transport phases of variable lengths, allows the film to start without jerking, accelerate slowly, and brake smoothly, with a gradually decreasing deceleration avoiding any abrupt transitions over the entire movement path and minimizing noise and film stress. At the same time, the film frame is positioned exactly by precise motor adjustment using an angle sensor device, with no need to detect markings on the film.

The solution according to the invention therefore incorporates different path lengths for the individual transport phases, namely an acceleration phase, an optional synchronous phase, a deceleration phase, and position-adjusting phases to achieve an optimum transport pattern regarding film stress, noise, and transport energy.

Advantageously, longer acceleration and deceleration phases and hence shorter or even absent synchronous phases have lower acceleration and deceleration values and hence produce less film stress and noise. To cover the same distance in the same time, however, the maximum angular velocity must reach a higher value.

In one advantageous embodiment, the two points in time at which the first two timers begin their timing are predetermined by one fourth and by one half of the corresponding frame length, respectively. In this manner, transport is accomplished optimally, so that the delays set by the timers can accomplish their stated requirements of minimum film stress and minimum noise. The transition to the next phase occurs only after this entered time has expired.

In another advantageous embodiment, in each film transport step between the end of the acceleration phase and the start of the deceleration phase, a synchronous phase is provided for the motor, during which a constant voltage is applied to the motor. This produces lower maximum speed and hence reduced motor stress, as well as speed correction prior to the braking or deceleration phase, so that incorrect final speed following the acceleration phase can be corrected at least partially.

According to another advantageous embodiment, the synchronous phase is regulated adaptively as a function of the motor speed at the end of the deceleration phase, as determined over several frames. By incorporating transport information on several previous frames, for example regarding speed at certain locations or speed at the end of the braking or deceleration phase, external factors such as film friction, temperature, or the like can be compensated. Provision is also made for a speed-correcting effect before the deceleration phase, so that incorrect final speeds may be corrected after the acceleration phase.

Alternatively, according to another advantageous embodiment, the acceleration phase can be regulated adaptively as a function of the motor speed at the end of the braking or deceleration phase, as determined over several frames. Here again external factors such as film friction, temperature, or the like may be compensated and incorrect final speeds corrected.

One advantageous control and regulating device is characterized by a comparator connected to the output of the phase angle sensor and which deliver square-wave signals to a sequence control logic device corresponding to the individual phase-angle sensor measurements, the inputs of the sequence control device also receiving a frame step control signal indicating a complete frame step and a control signal to indicate film transport direction, the sequence control logic device linking these signals logically with one another, and also including counters for counting the various pulse signals as well as adjustable timers to deliver signals corresponding to the individual phases, and delivering two sequence logic output signals to a setpoint switch connected downstream and a rise limiter which delivers limiting value signals for the motor current in the acceleration and deceleration phases as well as for the motor voltage to the setpoint switch whose output, depending on the sequence logic output signals, sends one of the limiting value signals delivered by the rise limiter to the DC amplifier powering the drive motor.

Advantageous improvements of the invention are characterized in the subclaims and/or will be described in greater detail below together with the description of the preferred embodiment of the invention with reference to the figures.

Figure 1:
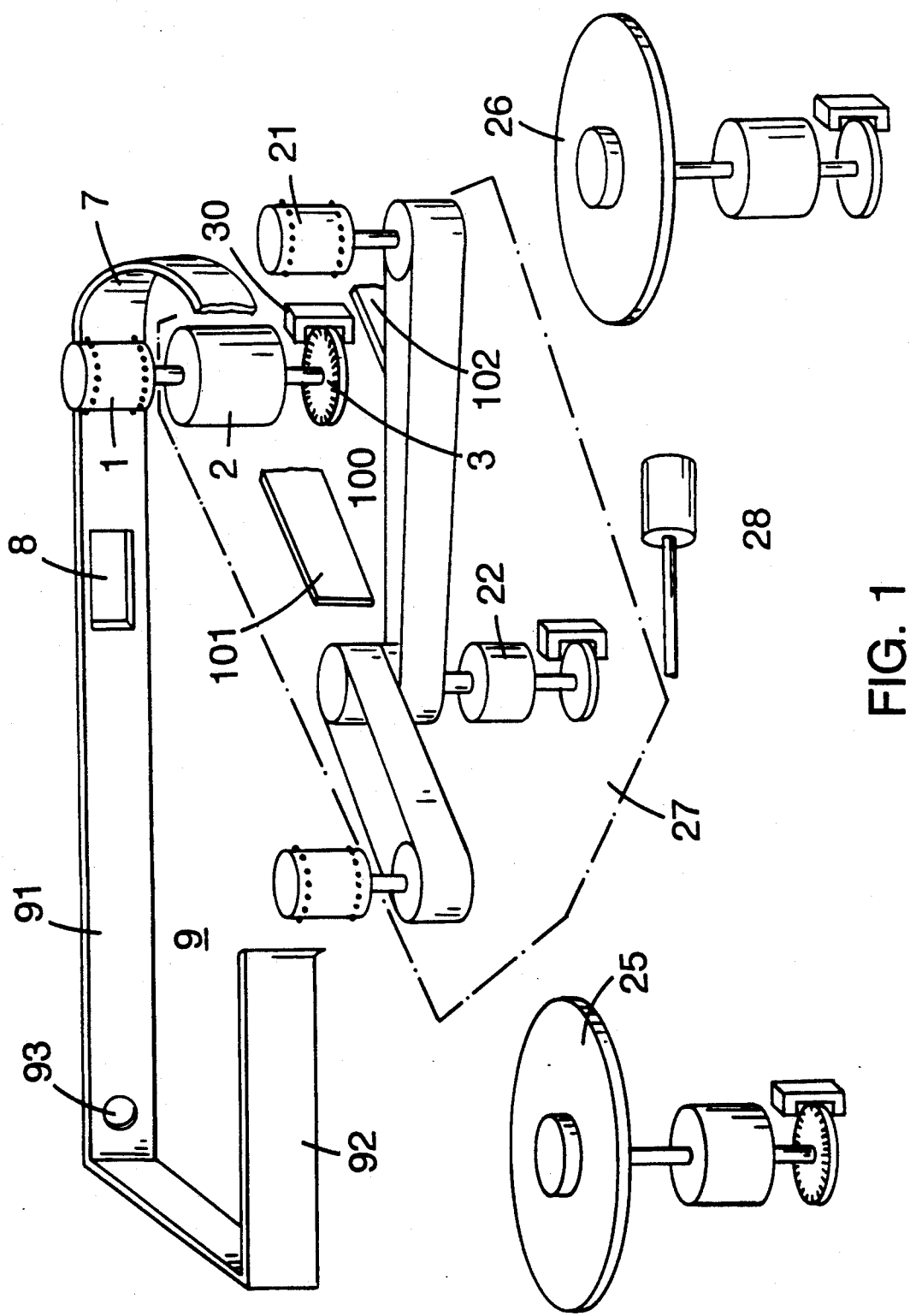
FIG. 1 is a schematic perspective view of the film channel with the individual driving elements.

The schematic perspective view of the film channel of a film projector shown in FIG. 1 shows a film transport device with a film transport sprocket 1, drive motor 2, angle sensor disk 3, feed and takeup devices 20, 21 driven by a common drive device 22, winding devices 25, 26 supporting the film reels, and, in a simplified schematic perspective view, film loop channels 9, 100 serving to take up the film loops on both sides of film window 8.

Drive motor 2, consisting of a high-dynamic DC servo motor, transmits its rotary motion to the film through directly powered film transport sprocket 1. Drive motor 2 is permanently connected by a shaft with angle sensor disk 3, so that an optoelectronic position-sensing device allows the exact position of drive motor 2 to be determined and transmitted.

In a preferred embodiment of the invention, angle sensor disk 3 is connected with the motor shaft and consists of an optically coded disk preferably made with four stripes per frame, i.e. two light and two dark segments. Hence, a frame is divided into four equal path segments so that the frame can be advanced exactly by ¼ to the film-pitch setting.

Film loop channels 9 and 100 serve to receive the film loops formed on either side of image window 8, with a loop-measuring device 93 being provided in film loop channel 9 located to the left of image window 8. Loop-measuring device 93 may optionally consist of a reflected light barrier or a luminous diode combined with a phototransistor opposite.

Film loop channel 9 is formed by two film loop channel walls 91 and 92, with one film loop channel wall 91 containing image window 8 and shaped in the vicinity of film transport sprocket 1 as film guide 7, which steers the film around film transport sprocket 1.

An adjusting slide 27 mounted in suitable guides is powered by an adjusting motor 28 and carries the imaging optics, the film transport including a film carrier and pressure plate, supply and takeup devices 20, 21, a pivoting guide, and drive means 22.

Figure 2:
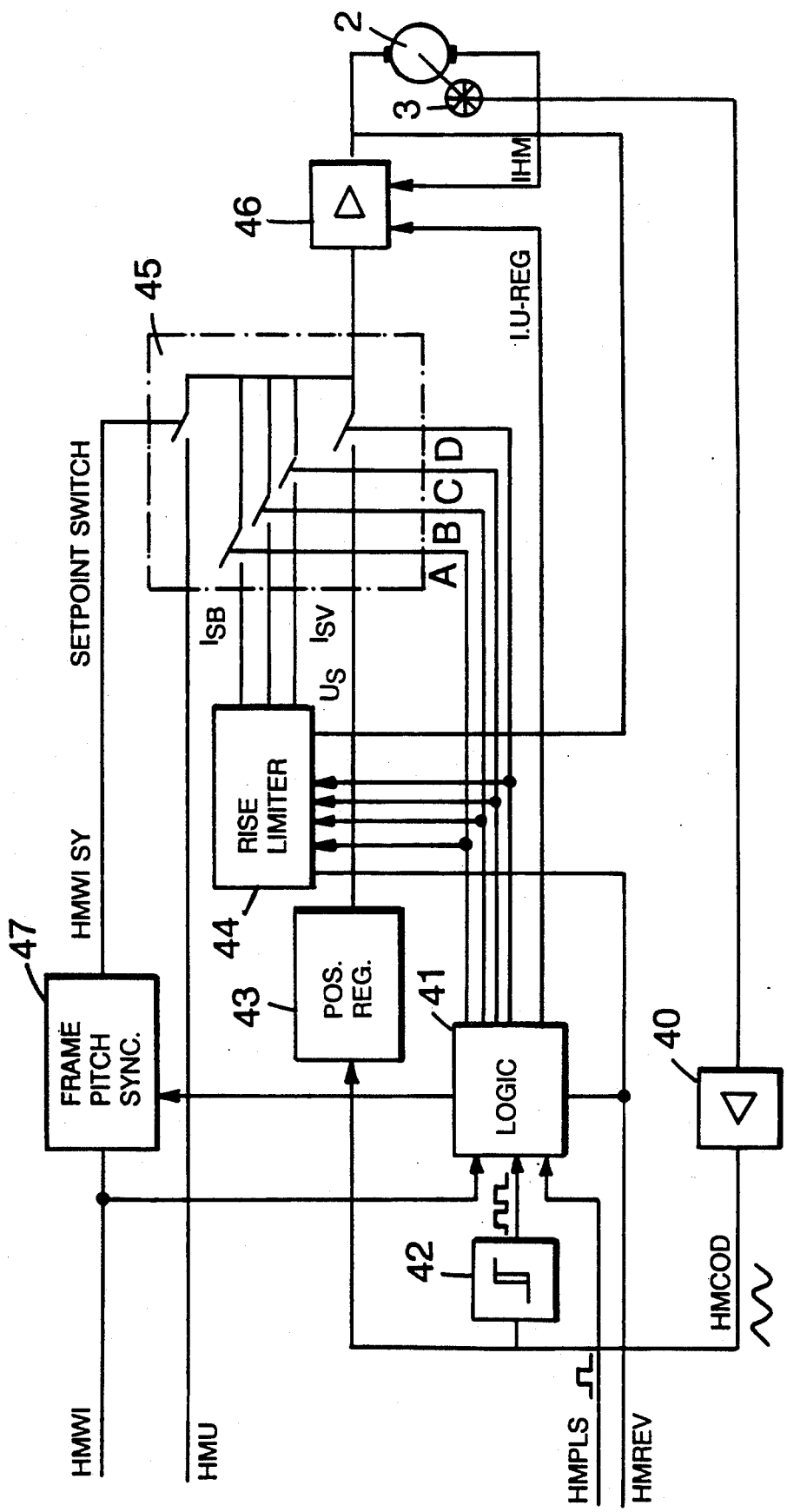
FIG. 2 is a block diagram of the control and regulating device for intermittent or continuous film feed.

FIG. 2 shows a block diagram of the control and regulating device for intermittent and continuous film transport employing a drive motor 2 whose shaft is connected with the film transport sprocket shown in FIG. 1 and engages the film perforations. In addition, the motor shaft of drive motor 2 is connected with a angle sensor disk 3 whose peripheral codes are scanned by sensor device 30 shown in FIG. 1. The position output signals of the position sensor are output through an amplifier 40 as encoded position signals HMCOD to a comparator 42 and a position regulator 43.

Comparator 42 compares the sinusoidal position output signals with a set reference voltage and generates square-wave signals applied to one input of a sequence control logic device 41 located downstream.

Figure 3:
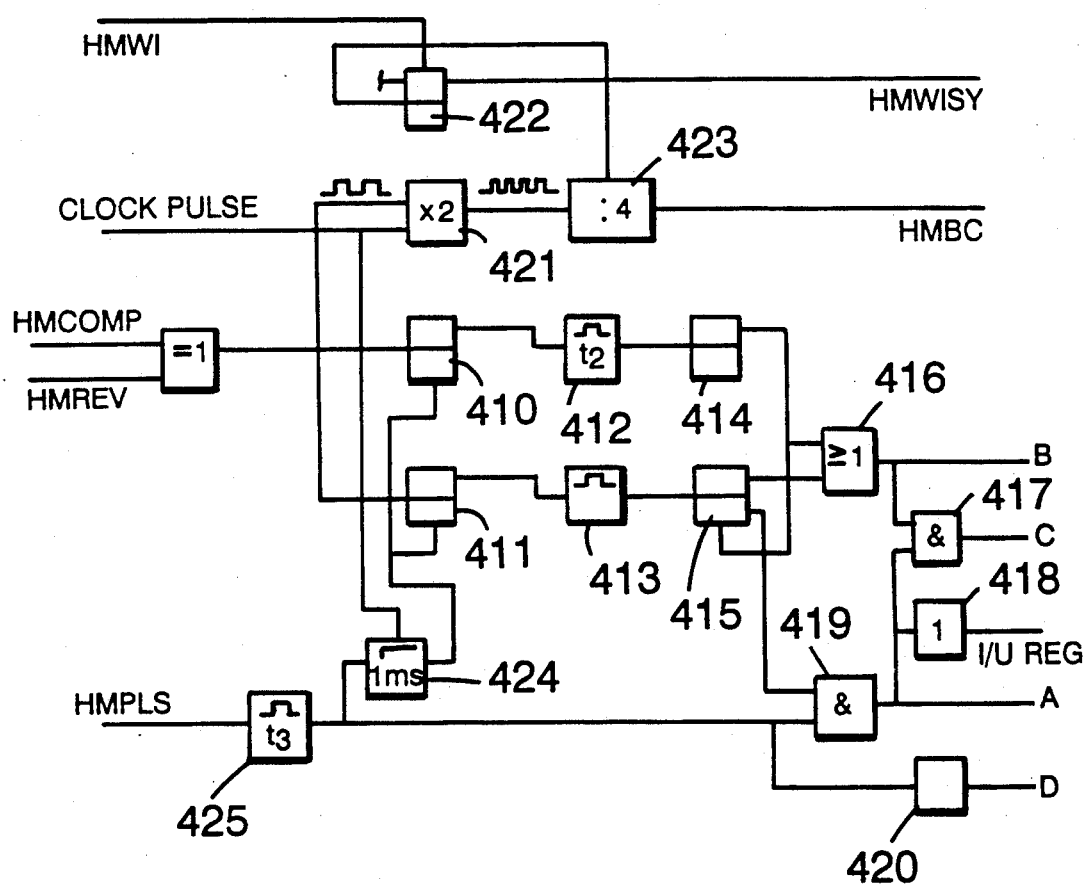
FIG. 3 is a detailed schematic of the sequence control logic.

Sequence control logic device 41 consists primarily of a logic module and/or programmable logic modules, counters, and three similarly adjustable timers, while FIG. 3 shows a detailed diagram of sequence control logic device 41.

External control signals such as a frame step control pulse HMPLS, a control signal for the film transport direction (HMREV), and angle sensor signal HMCOD can be applied to other inputs of sequence control logic device 41. In addition, sequence control logic device 41 can receive a signal HMWI for continuous fast winding. The sequence control logic device performs a logical linking of links the individual signals as well as counting processes and signal delays controlled by a clock. At the output of sequence control logic device 41 there are four sequence control logic output signals A, B, C, and D, output to the decoder of a setpoint switch 45 whose output controls a DC amplifier 46, which additionally receives a current and voltage regulating signal output by sequence control logic device 41 and a signal IHM proportional to the motor current of drive motor 2, and controls drive motor 2 on the output side.

Position regulator 43, depending on the sensor signal supplied to it, regulates the exact image orientation of a frame in the position-regulating phase and delivers a corresponding signal to setpoint switch 45, which, under the control of sequence control logic output signals A to D, passes the output signal of position regulator 43 to DC amplifier 46.

Sequence control logic output signals A, B, C and D are also applied to the inputs of a rise limiter 44, which, for example, is a second-order lowpass 2, limiting the rise in the curves of the current and voltage control signals supplied to DC amplifier 46 for drive motor 2 in such fashion that continuous transitions are made to the following transport phase in each case, with no torque discontinuities, and gentle acceleration and deceleration are ensured.

The output signals from rise limiter 44, specifically acceleration current signal $I_{SB}$, a constant voltage signal $U_S$ for the synchronous phase, and a deceleration current signal $I_{ST}$ are also supplied to setpoint switch 45 which passes these signals to the input of DC amplifier 46 depending on sequence control logic output signals A, B, C, and D. Rise limiter 44 is also connected with the output of DC amplifier 46.

In addition, a frame pitch synchronizer 47 is provided, which obtains a signal HMWI for continuous fast film winding as well as an output signal from sequence control logic device 41. The output signal from sequence control logic device 41 ensures correct frame pitch synchronization when switching from continuous fast winding to intermittent frame projection, with the position sensor signals being constantly counted during continuous high-speed operation and a film stop being executed by activating position regulator 43 only after a complete frame has gone by.

Output signal HMWISY of frame pitch synchronizer 47 controls a switch in setpoint switch 45 to which a fast-wind regulating voltage HMU delivered by a superior processor system is applied when fast-wind signal HMWI is present, said voltage HMU being output in this operating state directly to DC amplifier 46.

Setpoint switch 45, depending on sequence control logic output signals A, B, C, D, or the synchronized fast-wind signal HMWIY respectively, detects the corresponding torque setpoint to DC amplifier 46 supplying drive motor 2, which in turn moves the film by means of directly driven film transport sprocket 1.

FIG. 3 is a detailed circuit of sequence control logic device 41 according to FIG. 2.

The sequence control logic device contains two first flip-flops 410 and 411 whose inputs are linked to the positive or negative flanks of position sensor signal HMCOD, and whose outputs control a first and second timer 412 and 413 which trigger a third and fourth flip-flop 414 and 415 when they run down. Flip-flops 414 and 415 hold their respective states and output their sequence control logic output signals A, B, C, and D through logical connecting elements 416 to 420.

Logical linking elements 416 to 420 consist of a first OR element 416 whose inputs are connected to the outputs of third and fourth flip-flops 414 and 415, and whose output delivers a sequence control logic output signal B.

A first input of a first AND element 419 is connected to the output of fourth flip-flop 415, while the second input is connected to the output of a timer 25 whose input receives film pitch control pulse HMPLS. The output signal of timer 425 delivers sequence control logic output signal D through a negational element 420.

The output of first AND element 419 likewise corresponds to a sequence control logic output signal A and is simultaneously applied to the inputs of a second negational element 418 and to one input of a second AND element 417. The second input of second AND element 417 is connected to the output of OR element 416 and delivers sequence control logic output signal C at the output.

The output of second negational element 418 delivers the I/U regulated parameters.

The output of third timer 425 is also connected to the input of a delay element 424 connected by another input with a clock lead and whose outputs control first flip-flops 410 and 411. The clock input is additionally connected with one input of a pulse doubler 421, to whose second input the positive and negative flanks of the angle sensor signal are applied and whose output delivers twice the number of pulses, with four pulses being obtained per frame and output to a downstream counter 423 indicating the four image positions ¼, 2/4, ¾, and 4/4. The four frame positions are required to count the frames exactly (output signal HMBC) and/or to obtain a correct position (i.e. with correct film pitch) after switching from continuous high-speed operation to stepwise frame transport for image projection.

Another flip-flop 422, corresponding to film-pitch synchronizer 47 according to FIG. 2, receives at its input the signal HMWI for continuous fast winding of the film by which it is activated, and a signal from output Q3 of counter 423 which triggers flip-flop 422 and is reset on the basis of the correspondingly programmed D input, shutting off output signal HMWISY. Output signal HMWISY connects a fast-wind voltage to the DC amplifier. To switch back to intermittent frame transport after fast winding, signal HMWI is first shut off by the superior operating system, while synchronized signal HMWISY continues to be applied until the last fourth of the full frame and is shut off only by resetting flip-flop 422, with position regulator 43 as shown in FIG. 2 being activated at exact film pitch.

To explain the function of the method according to the invention as well as the control and regulating device according to the invention, the curves of several signals mentioned in the description of FIG. 2 are shown in FIGS. 4A–H (as a function of time).

Figure 4:
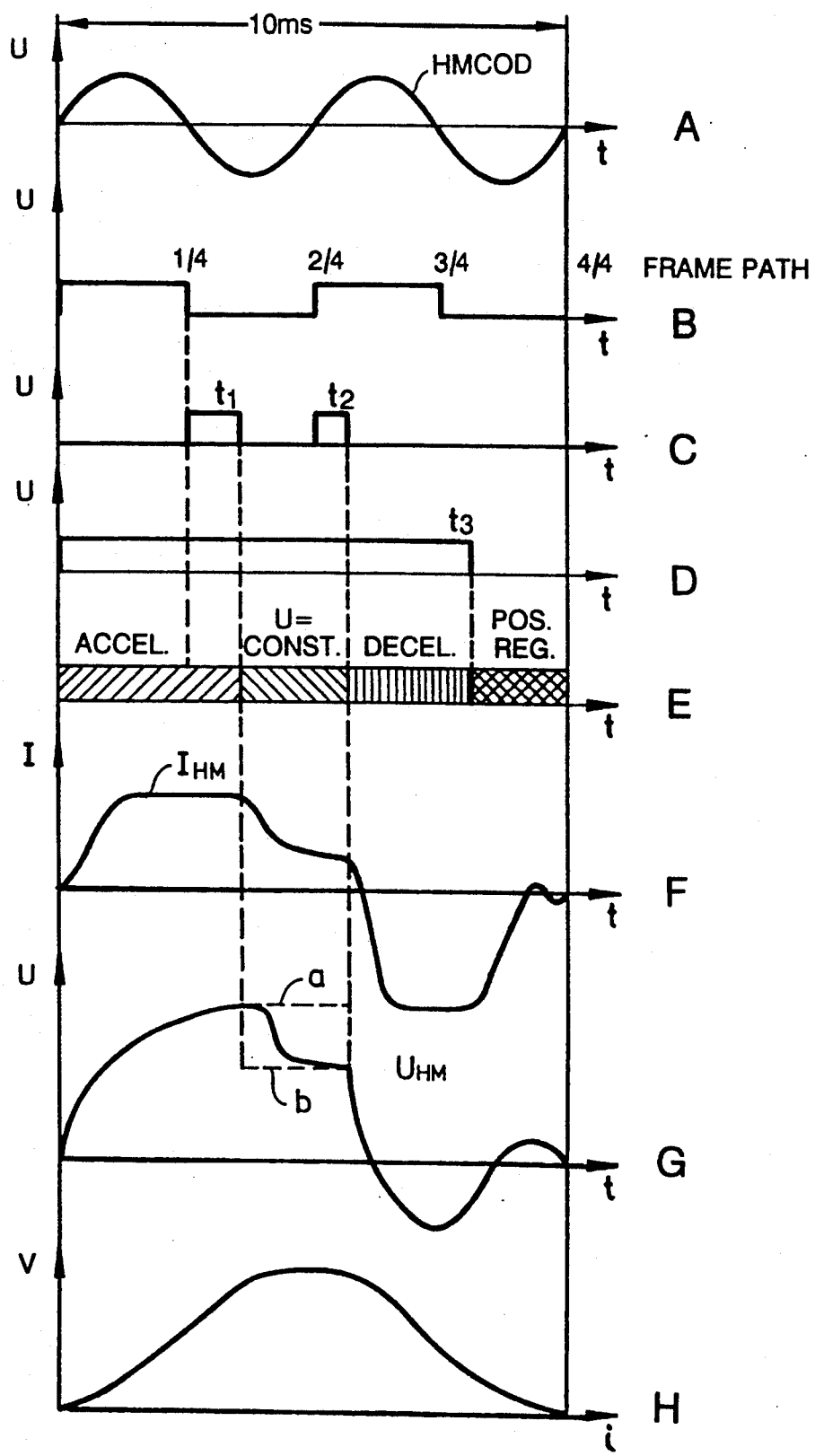
FIG. 4 is a series of graphs of various signals from the control and regulating device shown in FIG. 2 as a function of time.

FIG. 4(A) shows the sinusoidal pattern of angle sensor signal HMCOD at the output of signal amplifier 40 in FIG. 2, said signal being converted by comparator 42 into a square-wave signal, with the positive half-waves of the sinusoidal position sensor signal forming rectangles and one complete film step of about 10 milliseconds being divided into four equal path segments (FIG. 4(B)).

As the first movement phase passes, in other words, after one fourth of the film step, a first timer in sequence logic device 41 is started and triggers a pulse with a duration $T_1$; when the second phase elapses and/or the third phase begins, a timer is started that delivers a pulse with duration $T_2$ (FIG. 4(C)).

The beginning of a film step initiates another analogously adjustable timer in sequence control logic device 41, which delivers a pulse with duration $T_3$ (FIG. 4(D)).

As angle sensor measurement points ¼ and 2/4 are passed, a timer is started in each instance whose running time may be optimally set to reflect the minimum film stress and minimum noise requirements.

FIG. 4(E) shows individual sequence control logic output signals A and B whose lengths are set by the individual position sensor measurement points plus time delays $T_1$ and $T_2$ determined by the timers. In this manner, the acceleration phase, synchronous phase, and deceleration phase have the forms shown in FIG. 4(D).

The position regulating phase is triggered when the timer set for time interval $T_3$ runs down.

Since, as shown in FIG. 2, the motor current control signals are output by rise limiter 44 for the motor current during the acceleration phase, the constant motor voltage in the synchronous phase, and the motor current during the deceleration phase, a gentle rise and/or fall of the motor current is ensured in each phase and hence in the torque of drive motor 2, as well as smooth transitions from one phase to another.

FIG. 4(F) shows the curve of the motor current and hence the torque of drive motor 2 during the acceleration, synchronous, and braking phases as well as the position-regulating phase in which the frame to be positioned is located in front of the window with exact film pitch. This precise positioning is accomplished with the aid of the angle sensor disk, so that the film position need not be measured and regulated by detecting a mark on the film or by reading the perforations.

Design and manufacturing errors as well as eccentricities in the angle sensor disk and the film transport sprockets, despite exact positioning of the motor shaft, are reflected as film position errors, in other words, improper positioning of a frame in front of the image window. Since these are system-related periodic errors, which repeat with each motor revolution, they may be compensated by one-time measurement and storage, and periodic correction, of the angle sensor output signals.

The curves showing signals as a function of time in FIG. 4(A) to 4(F) indicates the different path lengths of the individual phases required to achieve an optimum transport profile as regards film stress, noise, and transport energy. Longer acceleration and deceleration phases and hence a shorter or even absent synchronization phase, advantageously produce smaller acceleration and deceleration values and hence impose less film stress and reduce noise. To cover the same distance in the same time, the maximum angular velocity must be higher.

The synchronous phase, produced by applying a constant voltage to drive motor 2, reduces the maximum speed and hence imposes less stress on the motor. The synchronous phase also effects a speed correction before the deceleration phase begins, so that incorrect speeds after the acceleration phase can be partially corrected.

After the acceleration phase plus time delay $T_1$ has elapsed, a constant voltage is applied to the drive motor, whose value can be changed over several film step. In this manner, compensation is provided for the fact that because of friction or other disturbing factors, the drive motor is running too fast or too slowly after ending the deceleration phase, so that if the final speed is too low, at the next frame a constant voltage corresponding to curve segment a is superimposed, while if the speed is too high at the end of the acceleration phase, a voltage corresponding to curve segment b is superimposed (FIG. 4(G)).

Alternatively, the acceleration phase can be regulated adaptively as a function of the speed of the drive motor at the end of the braking or deceleration phase as determined over several frame step. In this way also, external factors such as film friction, temperature or the like may be compensated and incorrect final speeds changed.

Adaptive regulation can be accomplished by determining the speed of the drive motor at the end of the braking or deceleration phase, using an angle sensor and optimizing it in a regulating procedure in such manner that a preset speed is reached at the end of the braking phase to ensure final positioning in the shortest possible time.

By changing the constant voltage applied to the drive motor during the synchronous phase as shown in FIG. 4(G) the speed can be varied at the end of the braking phase. A higher constant voltage (constant voltage a) gives a higher final speed, while a lower voltage (constant voltage b) leads to a lower final speed.

Adaptive speed regulation at the end of the braking or deceleration phase, for example, permits the film transport sprocket to be positioned precisely relative to the film, so that the latter is either pulled into the desired position in front of the image window for final positioning or, at a higher final speed, is braked into the desired final positioning location.

Since the length of the acceleration phase is determined by a timer started after ¼ of a frame step, the synchronous phase following the acceleration phase can be shortened as desired. Thus, for example, it is possible to use high frictional values to extend the acceleration phase until immediately before the second film pitch movement phase begins, so that in extreme cases the acceleration phase is prolonged until the second angle sensor phase plus the time delay t2 specified by the second timer, with a direct transition to the deceleration phase.

FIG. 4(H) shows the speed curve over one film step and shows the parabolic and hence gently rising speed during the acceleration phase and the gently falling speed in the deceleration and final positioning phase.

The invention is not limited in its embodiments to the preferred embodiment given above. Rather, a number of variations are possible which use the solution shown, even in embodiments that are basically different. In particular, the embodiment is not limited to the form using discrete logical modules, but can also be accomplished with programmed logic employing a microprocessor.

We claim:

1. Film transport device comprising a drive motor that includes a motor shaft, a film transport sprocket coupled to said motor shaft and driven by said motor, a position-sensor for generating output position signals that correspond to the angular position of said motor shaft, and a control device connected to control said drive motor to provide a series of film transport steps with each said film transport step being divided into an acceleration phase, a deceleration phase, and a final positioning phase, said control device including first, second and third timers and associated logic such that in each said film transport step, said first timer ends said acceleration phase, said second timer starts said deceleration phase, and said third timer starts said final position phase, each of said first and second timers beginning their timing at fixed times within the respective film transport step and said third timer being started at the beginning of the respective film transport step.

2. The film transport device of claim 1 wherein said associated logic cause said first and second timers to begin timing at the ¼ and ½ points, respectively, of the corresponding film transport step.

3. The film transport device of claim 1 wherein said control device further includes position regulator means for final-positioning of the film after each said deceleration phase at a firmly established position of said motor shaft, 4. The film transport device of claim 1 wherein said control device includes logic for providing a synchronous phase in each said film transport step between the end of said acceleration phase and the beginning of said deceleration phase, and circuitry for applying a constant voltage to said motor during said synchronous phase.

5. The film transport device of claim 1 wherein said control logic further includes means for generating a fast-wind regulating voltage, circuitry including a DC amplifier for applying said fast wind voltage to said drive motor for continuous transport of the film, and image position synchronizing circuitry responsive to counting of output signals of said position-sensor during continuous film transport and operative when switching from continuous film transport mode to intermittent film transport mode such that a complete image appears in image window, and the film not being stopped until a complete frame has passed.

6. The film transport device of claim 1 wherein said control device includes a comparator connected with the output of said position sensor, said comparator being adapted to deliver square-wave signals corresponding to individual position sensor measurement points, sequence control logic that has a frame pitch control signal input (HMPLSN) which indicates a complete frame pitch and a control signal input (HMREV) which indicates the film transport direction, circuitry linking said signal inputs logically together, a plurality of counters for counting pulse signals and adjustable timers responsive to said counters to produce output signals corresponding to individual ones of said phases, a downstream setpoint switch, said timers being connected to deliver sequence logic output signals to said downstream setpoint switch, a rise limiter for delivering limiting value signals for said drive motor during said acceleration and deceleration phases, as well as for the motor voltage to said setpoint switch, said setpoint switch, depending on said sequence logic output signals (A, B, C, D) sends one of the limiting value signal (ISB; US; ISV) delivered by said rise limiter to said DC amplifier supplying said drive motor.

7. The film transport device of claim 6 and further including a position regulator connected to said position sensor, said position regulator being adapted to emit a signal that triggers a film stop through said setpoint switch and said DC amplifier to said drive motor upon completion of one full film pitch.

8. The film transport device of claim 6 wherein said sequence control logic device is adapted to deliver output signals for main motor current and voltage regulation to said DC amplifier.

9. The film transport device of claim 1 wherein said associated logic causes said first and second timers to begin timing at the ¼ and ½ points, respectively, of the corresponding film transport step; and said control device further includes position regulator means for finalpositioning of the film after each said deceleration phase at a firmly established position of said motor shaft, logic for providing a synchronous phase in each said film transport step between the end of said acceleration phase and the beginning of said deceleration phase, and circuitry for applying a constant voltage to said motor during said synchronous phase.

10. The film transport device of claim 9 wherein said control logic further includes means for generating a fast-wind regulating voltage, circuitry including a DC amplifier for applying said fast wind voltage to said drive motor for continuous transport of the film, and image position synchronizing circuitry responsive to counting of output signals of said position-sensor during continuous film transport and operative when switching from continuous film transport mode to intermittent film transport mode such that a complete image appears in image window, and the film not being stopped until a complete frame has passed.

11. The film transport device of claim 9 wherein said control device includes a comparator connected with the output of said position sensor, said comparator being adapted to deliver square-wave signals corresponding to individual position sensor measurement points, sequence control logic that has a frame pitch control signal input (HMPLSN) which indicates a complete frame pitch and a control signal input (HMREV) which indicates the film transport direction, circuitry linking said signal inputs logically together, a plurality of counters for counting pulse signals and adjustable timers responsive to said counters to produce output signals corresponding to individual ones of said phases, a downstream setpoint switch, said timers being connected to deliver sequence logic output signals to said downstream setpoint switch, a rise limiter for delivering limiting value signals for said drive motor during said acceleration and deceleration phases, as well as for the motor voltage to said setpoint switch, said setpoint switch, depending on said sequence logic output signals (A, B, C, D) sends one of the limiting value signal (SB; US; ISV) delivered by said rise limiter to said DC amplifier supplying said drive motor.

12. The film transport device of claim 11 and further including a position regulator connected to said position sensor, said position regulator being adapted to emit a signal that triggers a film stop through said setpoint switch and said DC amplifier to said drive motor upon completion of one full film pitch.

13. The film transport device of claim 11 wherein said sequence control logic device is adapted to deliver output signals for main motor current and voltage regulation to said DC amplifier.

* * * * *